United States Patent [19]

Tanaka et al.

[11] Patent Number: 4,897,725
[45] Date of Patent: Jan. 30, 1990

[54] GHOST CANCELING CIRCUIT

[75] Inventors: Tadaaki Tanaka; Fumiyoshi Sasaki; Tetsuro Miyazaki, all of Tokyo; Reiichi Kobayashi, Osaka; Tatsuya Shiki, Osaka; Michio Kobayashi, Osaka, all of Japan

[73] Assignees: NEC Home Electronics Ltd., Osaka; Nippon Hoso Kyokai, Tokyo, both of Japan

[21] Appl. No.: 322,157

[22] Filed: Mar. 13, 1989

[30] Foreign Application Priority Data

Mar. 11, 1988 [JP] Japan ................... 63-57544

[51] Int. Cl.4 ......................... H04N 5/123; H04N 9/64
[52] U.S. Cl. ...................................... 358/167; 358/36; 358/905
[58] Field of Search ................... 358/36, 37, 166, 167, 358/905

[56] References Cited

U.S. PATENT DOCUMENTS

| 3,956,585 | 5/1976 | Butler et al. | 358/905 |
| 4,476,491 | 10/1984 | Murata et al. | 358/167 |
| 4,502,077 | 2/1985 | Morotomi et al. | 358/167 |

Primary Examiner—John K. Peng
Attorney, Agent, or Firm—Cushman, Darby & Cushman

[57] ABSTRACT

A ghost canceling circuit comprising a Fourier transforming circuit for Fourier transforming a reference waveform contained in the received television signal while converting the analogue signal into digital form, a device for holding and outputting a reference waveform Fourier coefficient obtained by Fourier transforming the reference waveform contained in the television signal at the transmission side, a signal processing portion in which the outputted reference waveform Fourier coefficient is divided by the result of the A/D conversion, the divided Fourier coefficient is reverse Fourier transformed, and the reverse Fourier transformed Fourier coefficient is supplied to a transversal filter recognizing it as a tap gain.

11 Claims, 3 Drawing Sheets

GHOST CANCELING CIRCUIT

BACKGROUND OF THE INVENTION

The present invention relates to a ghost canceling circuit which is installed in a television receiver.

Generally, a television receiver receives through an antenna a television signal composed by multiplying a directly received signal and delay signals which reach the antenna through several reflecting routes in which the signals are reflected by neighboring geographical features, neighboring buildings, moving vehicles or the like. Due to such delay signals, generally, multiple images may be come out in some extent on the received picture. Such delay signals causing the multiple images are called "a ghost" and a phenomenon that large multiple images deteriorate a quality of the picture is called "a ghost obstacle".

There has been known a conventional ghost canceling circuit having a transversal filter for generating a dummy ghost, a tap gain control circuit for controlling a tap gain of the transversal filter and a signal composing circuit. The transversal filter of the conventional circuit is provided with a coefficient circuit group, an adding circuit and a delay circuit group which connects in series a delay, an attenuation and an adding which would cause a ghost based on multiple reflections, so that the dummy ghost is generated. The dummy ghost thus generated reverse in polarity is added to the original received television signal by the signal composing circuit, thereby canceling the ghost component contained in the original signal.

Generally, an influence of a ghost varies moment by moment in accordance with a change in frequency of a received radio wave raised by changing receiving channels, with a change in position of a moving vehicle, a ship or an air plane passing near the television receiver, or the like. Therefore, the tap gain of the transversal filter should be controlled, moment by moment, to be an optimum value. In order to obtain the tap gain control, a reference waveform for detecting an amount of the ghost is included in a television signal by a transmitter side.

Further, the tap gain control circuit installed in the television receiver generates an optimum tap gain in accordance with a result of analysis of the deformation of the reference waveform extracted from the received television signal and with a result of the ghost cancellation fed back from the following detection. The optimum tap gain is then supplied to the transversal filter.

The conventional ghost canceling circuit described above is of a feed-back type in which the result of the ghost cancellation is detected by a following detection circuit and fed back to the forwarding tap gain control circuit. Therefore, such a circuit would not be sufficient in response speed and in ghost canceling accuracy.

SUMMARY OF THE INVENTION

In view of the above-noted defects of the conventional device, an object of the present invention is to provide a ghost canceling circuit of a feed-forward type which is improved in response speed and in ghost canceling accuracy.

The foregoing and other objects have been achieved by the provision of a ghost canceling circuit which, according to the present invention, is provided with a Fourier transforming circuit for Fourier transforming a reference waveform contained in the received television signal while converting the analogue signal into digital form, means for holding and outputting a reference waveform Fourier coefficient obtained by Fourier transforming the reference waveform contained in the television signal at the transmission side, a signal processing portion in which the outputted reference waveform Fourier coefficient is divided by the result of the A/D conversion, the divided Fourier coefficient is reverse Fourier transformed, and the reverse Fourier transformed Fourier coefficient is supplied to a transversal filter recognizing it as a tap gain.

DESCRIPTION OF THE PREFERRED EMBODIMENTS

The preferred embodiments will now be described in detail with reference to accompanying drawings.

Figure 1:
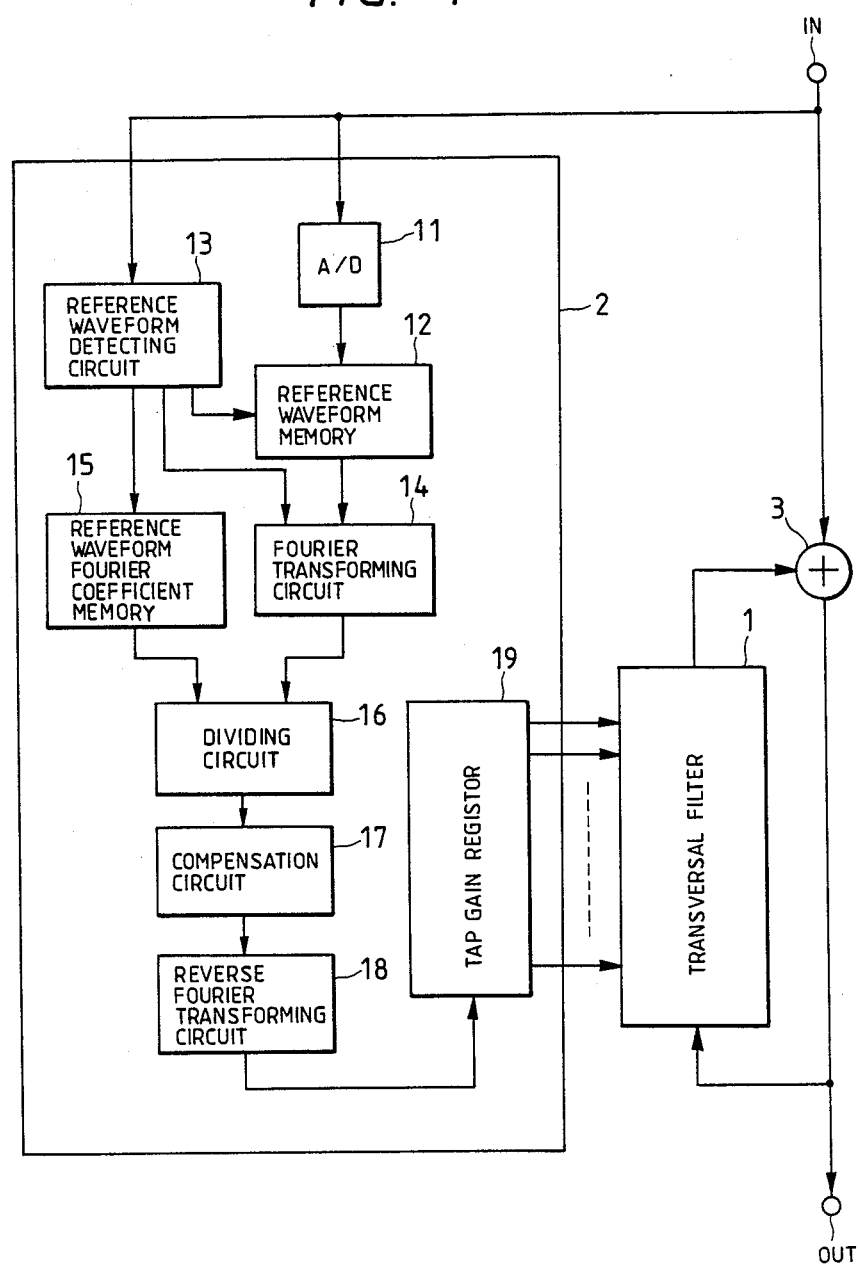
FIG. 1 is a circuit diagram showing a ghost canceling circuit according to an embodiment of the present invention.

FIG. 1 is a block diagram showing a ghost canceling filter circuit according to an embodiment of the present invention. The circuit shown in FIG. 1 is provided with a transversal filter for generating a dummy ghost signal, a tap gain control circuit 2 and an adder 3.

The tap gain control circuit 2 is provided with an A/D (analogue/digital) converter 11, a reference waveform memory 12, a reference waveform detecting circuit 13, a Fourier transform circuit 14, a reference waveform Fourier coefficient memory 15, a dividing circuit 16, a compensation circuit 17, a reverse Fourier transform circuit 18 and a tap gain holding register 19.

Figure 2:
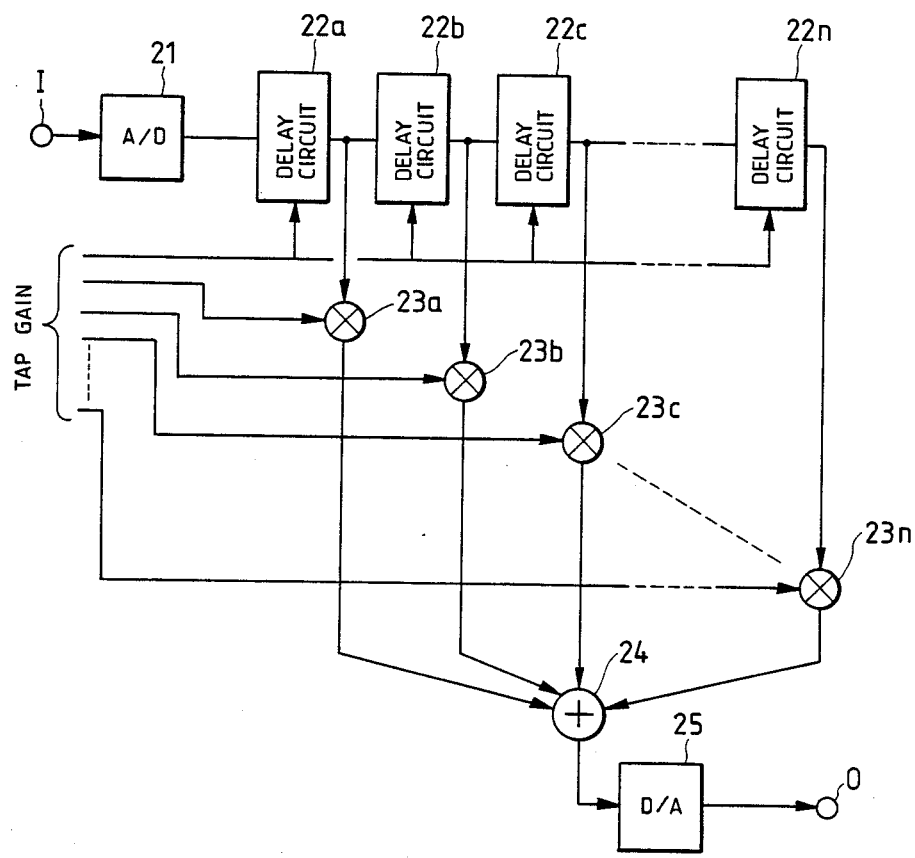
FIG. 2 is a circuit diagram showing a transversal filter shown in FIG. 1.

As shown in FIG. 2, the transversal filter 1 consists of a plurality of delay circuits 22a, 22b, 22c. . . 22n connected in series, a plurality of multipliers 23a, 23b, 23c, . . . 23n for multiplying a tap gain with each of outputs of the delay circuits, a transversal filter portion including an adder 24 which adds all of outputs of the multipliers and a D/A (digital/analogue) converter 25. The transversal thus constructed generates a dummy ghost signal in accordance with tap gains supplied by the tap gain control circuit 2.

Figure 3A:
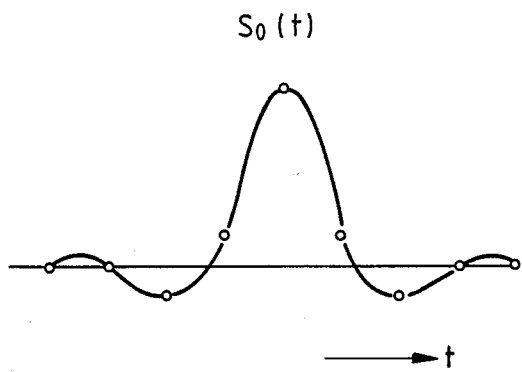
FIG. 3 shows a reference waveform contained in a transmitted television signal and Fourier coefficient thereof.
Figure 3B:
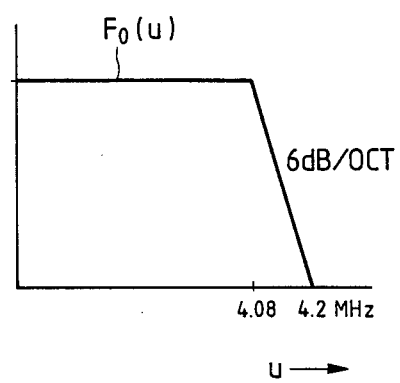

A reference waveform $S_O(t)$ shown in FIG. 3A for detecting a ghost is added to a predetermined portion of the television signal on a vertical blanking period, for example, by a transmission side of the television signal. The band-width of the reference signal waveform $S_O(t)$ is limited by passing through a low pass filter circuit, which has an amplitude-frequency characteristic an impulse waveform of which is as shown in FIG. 3B.

The reference waveform Fourier coefficient memory 15 preliminary stores therein a discrete Fourier coefficient group $F_O(u)$. The discrete Fourier coefficient group $F_O(u)$ is obtained by converting an analogue signal of the original reference waveform $S_O$ shown in FIG. 3A to a digital form and Fourier transforming the digital signal of the reference waveform. The Fourier coefficient $F_O(u)$ is just what explaining the amplitude-frequency characteristic shown in FIG. 3B by a discrete sampling value group.

Figure 4A:
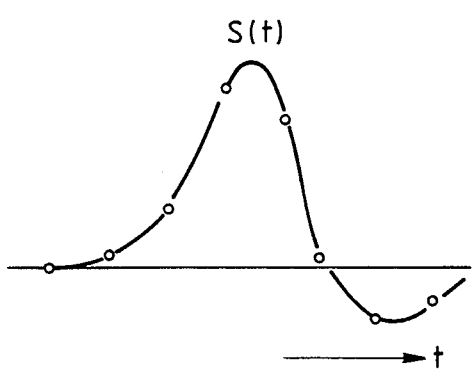
FIG. 4 shows a reference waveform extracted from a received television signal and a Fourier coefficient thereof.
Figure 4B:
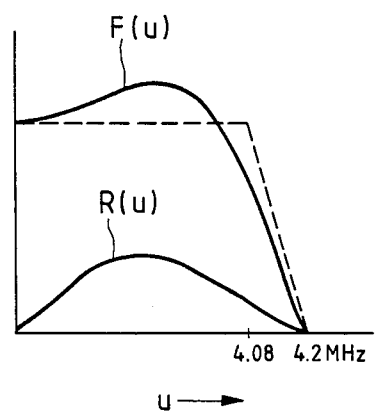

An actual reference waveform S(t) contained in the television signal which is received by a television receiver is supplied through the input terminal IN and the A/D converter 11 to the reference waveform detecting circuit 13 where the reference waveform S(t) is extracted from the predetermined portion of the television signal in accordance with a timing control of the reference waveform detecting circuit 13. Then the reference waveform is stored in the reference waveform memory 12. The reference waveform S(t) thus received is deformed as shown in FIG. 4A relative to the original reference waveform $S_O(t)$ included by the transmitter side by an influence of the transmitting characteristic of the signal containing therein the ghost. The received reference waveform S(t) is read from the reference waveform memory 12 and supplied to the Fourier transform circuit 14 where the reference waveform is Fourier transformed to the discrete Fourier coefficient group F(u). FIG. 4B shows an example of the discrete Fourier coefficient group F(u) where R(u) designates an amount of phase rotation.

The dividing circuit 16 divides the reference Fourier coefficient $F_O(u)$ read from the reference Fourier coefficient memory 15 by the Fourier coefficient F(u) having a corresponding frequency components received from the Fourier transforming circuit 14, thereby generating a tap gain coefficient 1/G(u) expressed by following equation.

$$1/G(u) = F_O(u)/F(u) \quad (1)$$

Now assuming that the transmission characteristic containing therein the ghost is g(t), the reference waveform S(t) is expressed by following equation.

$$S(t) = g(t) \otimes S_O(t) \quad (2)$$

The equation (2) is Fourier transformed thereby obtaining the Fourier transforming coefficient F(u) according to following equation.

$$F(u) = G(u) F_O(u) \quad (3)$$

The reference waveform S(t) deformed by an influence of the ghost can be compensated in order to attain the original reference waveform $S_O(t)$ by following equation.

$$S_O(t) = [1/g(t)] \otimes S(t) \quad (4)$$

The equation (4) is Fourier transformed to obtain the reference Fourier coefficient $F_O(u)$ by the equation (5) below.

$$F_O(u) = F(u)/G(u) \quad (5)$$

The equation (5) is the same as the equation (1).

Accordingly, a dummy ghost can be obtained by reverse Fourier transforming, by the reverse Fourier transforming circuit 18, the result of division of the dividing circuit 16, and then employing the reverse Fourier transformed signal as a tap gain for the transversal filter 1.

The compensation circuit 17 enhances or mitigates a high frequency component of the output of the dividing circuit 16 or rises a rapid down part or lowers a rapid up part of the divided value at a particular frequency to about a degree of the circumferential values recognizing it as a beat disturbance, or the like.

The dummy ghost generated by the transversal filter 1 is reverse in phase to that contained in the received television signal. The dummy ghost is added by the adder 3 to the ghost in the television signal so that the latter ghost is canceled by the dummy ghost. The television signal in which the ghost is canceled is supplied to the following signal processing part of the television receiver through the output OUT.

The embodiment described above employs as the reference waveform the waveform the impulse of which is band filtered. However, the reference waveform may be a stepped waveform, for example, which is band filtered if applicable.

In an embodiment in which a waveform impulse of which is band filtered is employed as a reference waveform, a Fourier coefficient $F_O(u)$ is constant in the band. In this case, therefore, the reference waveform Fourier coefficient memory 15 and the dividing circuit 16 shown in the present FIG. 1 may be eliminated. Further, in case that the reference waveform is made by integrating the waveform mentioned above, that is, the stepped waveform, such a reference waveform is differentiated in the television receiver in order to obtain the above impulse waveform and, accordingly, the reference waveform Fourier coefficient memory 15 and the dividing circuit 16 may be eliminated.

According to the present invention, as described above, the ghost canceling circuit is of a feed-forward type comprising a Fourier transforming circuit for Fourier transforming a reference waveform contained in the received television signal while converting the analogue signal into digital form, means for holding and outputting a reference waveform Fourier coefficient obtained by Fourier transforming the reference waveform contained in the television signal at the transmission side, a signal processing portion in which the outputted reference waveform Fourier coefficient is divided by the result of the A/D conversion, the divided Fourier coefficient is reverse Fourier transformed, and the reverse Fourier transformed Fourier coefficient is supplied to a transversal filter recognizing it as a tap gain.

Therefore, such a system is largely advantageously improved in response speed and ghost canceling accuracy relative to the conventional feedback system in which the signal is processed on time axis.

Further, since the system of the present invention processes the signal on frequency axis, the tap gain can readily be compensated such as enhancing a high frequency component of the signal or eliminating a beat disturbance.

What is claimed is:

1. A ghost canceling circuit comprising:
   means for generating a dummy ghost;
   means for adding an output of said dummy ghost generating means to the received television signal; and
   means for controlling a tap gain of said dummy ghost generating means in accordance with a reference waveform contained in the received television signal,
   wherein said tap gain controlling means comprising:
   means for extracting said reference waveform from the received television signal;
   means for Fourier transforming said received reference waveform, said received reference waveform Fourier transforming means outputting a Fourier coefficient; and
   means for reverse Fourier transforming said transformed reference waveform whereby outputting said tap gain.

2. The ghost canceling circuit of claim 1, further comprising:

means for preliminary Fourier transforming an original reference waveform included in the television signal at a transmission side; means for storing a Fourier coefficient obtained by said original reference waveform Fourier transforming means; and means for dividing an output of said Fourier coefficient storing means by said Fourier coefficient of the received television signal.

3. The ghost canceling circuit of claim 2, wherein said reference waveform is made by band filtering an impulse waveform.

4. The ghost canceling circuit of claim 2, wherein said reference waveform is made by band-filtering a stepped waveform.

5. The ghost canceling circuit of claim 1, wherein said reference waveform extracting means comprises means for converting said reference signal of the analogue form into digital form and means for storing said received reference waveform digitally formed.

6. The ghost canceling circuit of claim 1, further comprising means for compensating said Fourier coefficient.

7. The ghost canceling circuit of claim 6, wherein said compensating means enhances a high frequency components of said Fourier coefficient.

8. The ghost canceling circuit of claim 6, wherein said compensating means mitigates a high frequency components of said Fourier coefficient.

9. The ghost canceling circuit of claim 6, wherein said compensating means rises a particular frequency portion of said Fourier coefficient to substantially a degree of the circumferential frequency of said Fourier coefficient whereby obtaining a beat cancellation.

10. The ghost canceling circuit of claim 1, wherein said dummy ghost generating means is a transversal filter.

11. The ghost canceling circuit of claim 1, further comprising a tap gain register.

* * * * *